Oct. 9, 1934.　　　W. W. HARTMAN　　　1,975,943
BREAD SLICER
Filed July 19, 1932　　　3 Sheets-Sheet 1

Inventor
William Walter Hartman

Attorney.

Patented Oct. 9, 1934

1,975,943

UNITED STATES PATENT OFFICE 1,975,943

BREAD SLICER

William Walter Hartman, Los Angeles, Calif.

Application July 19, 1932, Serial No. 623,364
In Canada June 22, 1932

17 Claims. (Cl. 146—153)

This invention relates generally to slicing machines, and more particularly to slicer drive mechanisms adapted to move articles to be sliced at a periodically varying speed through the slicing mechanism, and to adjustment means adapted to effect contact of the article with the slicing knives at any desired point in the speed cycle. This invention has been developed with particular reference to bread slicing machines and will mainly be explained in that specific aspect, though it is to be understood that I am in nowise to be limited thereto for it can be adopted by suitable changes to other slicing machines and article carriers and still be within the spirit of my invention.

A large proportion of bread is now sliced before being sold, the slicing, packaging, and handling being done by automatic machinery operating as rapidly as possible to effect a maximum capacity and minimum cost. The packaging and handling operations could formerly be performed at a higher rate of speed than could be slicing operation, so that the slicing machine has heretofore been the slowest unit in the series and one which it has been most desirable to speed up. I have invented a type of slicer disclosed in my copending applications entitled Bread slicer, Ser. No. 429,050, filed Feb. 7, 1930, and Ser. No. 608,754, filed May 2, 1932, for the purpose of increasing the rate at which loaves of bread may be sliced; and the improvements of the present application are applicable to that type of slicer as a further step in increasing the slicing rate without damaging the loaf.

A large share of the difficulty encountered in high speed slicing arises from the fact that the loaf crust is somewhat tougher than the loaf interior and consequently requires a longer time to be cut through. The forward crust, that is the crust on the side where the knives enter the loaf, is held against the knives only by the loaf interior, which, being warm and soft at the time of slicing, offers very little support to the crust. Consequently, unless the loaf is moved slowly until the forward crust has been cut through, the forward crust remains stationary against the cutting edges of the knives until the crust is penetrated while at the same time the continuously moving loaf carrier advances the rear crust of the loaf so that the loaf as a whole is crushed between the loaf carrier and the knives. Thus, if the carrier speed is advanced to maximum rate for slicing the loaf interior, the loaf is crushed and deformed because of the cutting resistance of the outside crust, and so suffers greatly in final appearance; and if, on the other hand, the carrier speed is reduced to that proper for cutting the crust, the over-all handling rate of the slicing machine may be so low as to slow up the operations performed by subsequent machines.

It thus becomes the general object of the invention to provide a loaf carrier and driving mechanism therefor adapted to move a loaf of bread through the slicing mechanism at such varying speed as to slice the loaf in a minimum of amount of time and yet to do so without crushing the loaf.

It is also an object of my invention to provide means for adjusting the carrier drive in order to obtain any desired carrier speed, and to provide means for adjusting the position of the slicing mechanism so that the slicer may properly handle various types and sizes of loaves by effecting initial contact of the slicing knives with the loaf at any desired point in the movement of the loaf carrier.

It is a further object of my invention to provide simplified and improved means to attach the slicing knives to their driving members so that attachment is easily and quickly done, yet the knives will not accidentally become disconnected.

To attain these objects in machines of the type referred to having a carrier with a plurality of outwardly projecting arms about its periphery and driven by a carrier driver having engaging members that mesh with the projecting arms of the carrier, I pivotally attach the carrier engaging members to the arms of star wheels driven by a drive shaft moving at constant velocity, and provide cam means to vary the velocity of the carrier engaging members as they move around the drive shaft so that the carrier is driven with a periodically changing velocity. The cam may be given any necessary contour or outline to produce the desired change or changes in the carrier velocity. By this means the carrier may be moved at a suitable low speed at the time the cutting knives initially reach the loaf, and the carrier velocity may be increased after the knives have cut through the crust until the carrier is moving at the maximum velocity at which the loaf interior may be sliced, thus providing suitable carrier velocities for those different portions of the loaf having different cutting resistances. Although the rear crust of the loaf is well supported by the loaf carrier and will consequently not offer so much cutting resistance, the slowing down of the loaf carrier may be well timed to occur as the knives leave the loaf so as to avoid tearing the crust.

The slicing mechanism is provided with pivotal mountings, so that the slicing knives may be shifted along the loaf path in order to initially contact the loaf at a time of low carrier velocity. Where the loaf carrier is circular in shape, the cutter mechanism is pivoted to swing about the carrier axis. It is preferably by movement of the knives about the loaf carrier that the machine is adjusted to loaves of various widths.

In order to explain fully and clearly the nature of my improvements I show them in conjunction with a specific loaf carrier and cutter mechanism such as are shown and described in detail in my prior copending applications on Bread slicer, Ser. No. 429,050, filed Feb. 17, 1930, and Bread slicer, Ser. No. 608,754, filed May 2, 1932, because the slicing mechanism and loaf carrier shown therein are in particular adapted to my variable speed carrier driving mechanism and my adjustable slicing head mounting. Reference may be had to copending applications for a more extended explanation of features of my slicing machine herein shown and described but not here claimed, being claimed in said other applications.

The improvements of the present invention and here claimed, are particularly concerned with the adjustable mounting of the slicing head so that the cutters may be shifted along the loaf path, and with means to control the velocity of the carrier engaging members so as to impart the desired periodic changes of velocity to the loaf carrier. It will be understood that my improvements are not necessarily limited to use with the particular type of mechanisms shown, since they may be used in connection with other types of slicing mechanisms and with other article carriers and drive means therefor than are herein shown and described.

The foregoing and other objects and advantages of my invention may best be understood by reference to the following detailed description and to the appended drawings wherein I show and describe a preferred embodiment of my invention.

Figures 1, 9:
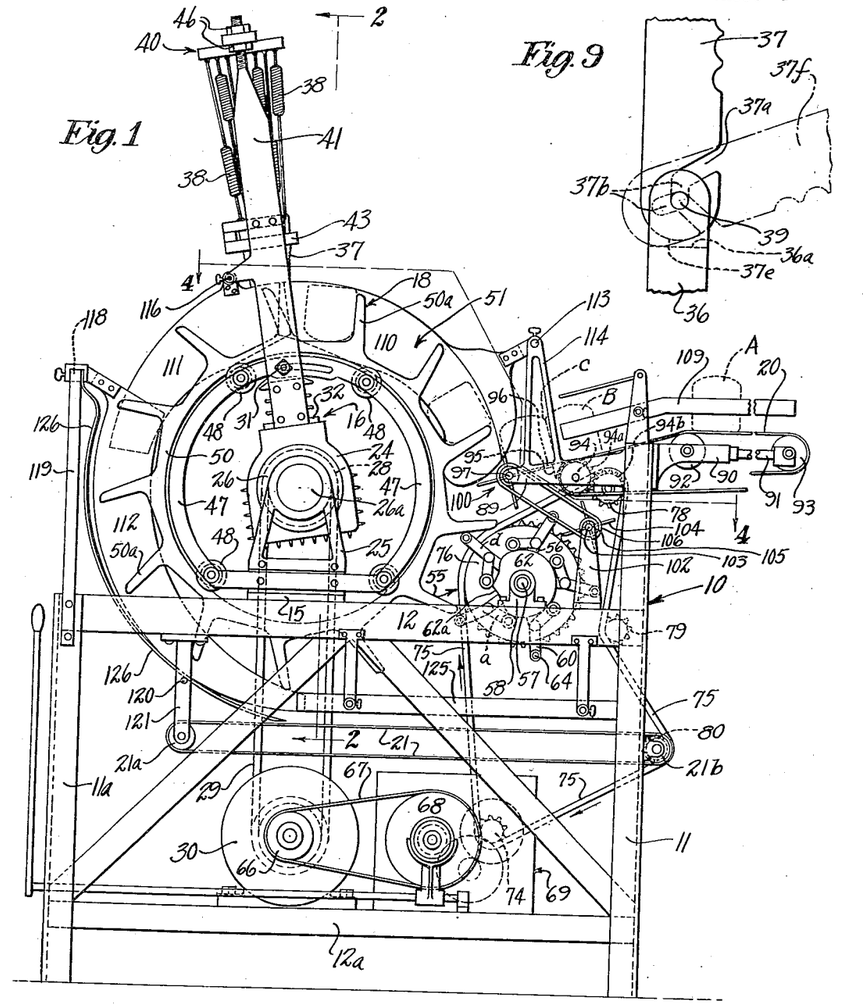
Fig. 1 is a side elevation of a slicing machine constructed according to my invention.
Fig. 9 is an enlarged fragmentary detail view showing the manner of fastening a cutter to a slide-rod.
Figure 2:
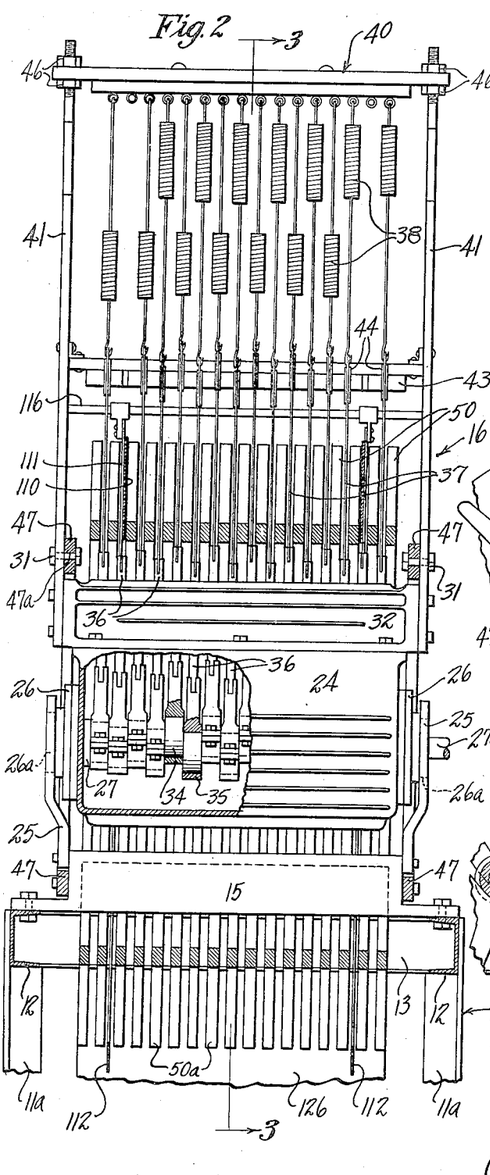
Fig. 2 is a side elevation of the slicing mechanism with the loaf carrier in vertical median section, as on line 2—2 of Fig. 1.

Referring first to Figs. 1 and 2, the numeral 10 denotes generally a framework consisting of front and rear upright members 11a and 11 joined by longitudinal horizontal members 12 and 12a, and transverse horizontal members 13 and 13a, together with suitable cross bracing. Mounted upon upper horizontal members 12 of this frame structure, is a laterally extending base member 15 upon which is mounted the slicing mechanism generally indicated at 16. Also mounted upon this base member 15 is suitable supporting structure for the rotary bread carrier, generally indicated by the numeral 18, that forms the preferred means for moving the loaf through the cutters. The bread is fed to this carrier by means of a suitable conveyor belt 20 and certain mechanism, hereinafter to be set forth in detail, for receiving the bread bottom side down from the belt, inverting it, and feeding it bottom side up to the carrier; and the sliced loaf is removed from the under side of the carrier by means of delivery belt 21, all as will be more fully understood as the description progresses.

Figure 3:
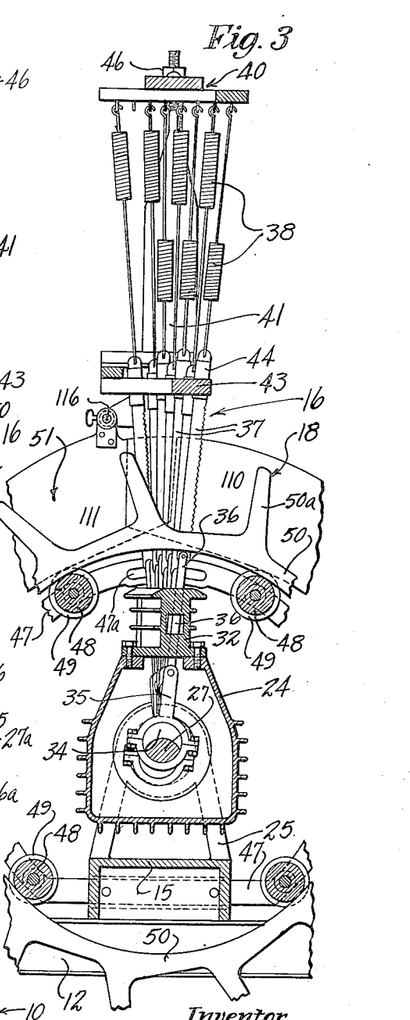
Fig. 3 is a vertical sectional view of the slicing mechanism on line 3—3 of Fig. 2.

A preferred form of slicing mechanism or slicing head, as it may be termed, is shown particularly in Figs. 2 and 3, and comprises a series of laterally spaced knives, means to support the knives, and means to drive the knives. The knife driving mechanism is housed within crank-case 24 which is pivotally supported at its ends between two supporting brackets 25 attached to either end of base 15. End plates 26 on the crank-case have circular bearing portions 26a that are journaled within brackets 25 so that the crank-case, together with the knives supported above it, may be rocked about its horizontal axis. Fig. 3 shows the slicing head in the vertical position while in Fig. 1 the head is indicated as being tilted to one side. By so pivotally mounting the crank-case, it is possible to rock the entire slicing mechanism about the axis of the loaf carrier to shift the knives backwards and forwards along the path of the loaf in the carrier. The slicing head is clamped in adjusted positions by bolt 31. The purpose and advantages of this motion will be discussed later.

Crank-case 24 comprises a main body portion open at both ends at the top through its entire length. The top opening is continuous with at least one end opening so that the connecting rods and slide-rods, to be described, can be attached to the crank-shaft and the entire assembly inserted into the crank-case as a unit. The open ends of the crank-case body are closed by end plates 26 which carry suitable bearings for journaling crank-shaft 27 so that the axis of the crank-shaft coincides with the axis about which the crank-case pivots. The crank-shaft extends through one end plate, and carries on the extension 27a drive pulley 28 which may be driven by belt 29 from motor 30. The closing of the crank-case is completed by slide-rod guide 32 bolted to the top of the crank-case.

Crank-shaft 27 is provided with a series of cranks in the form of eccentric 34, to which are connected the lower ends of connecting-rods 35 that vertically reciprocate the cutters. The eccentrics are arranged in pairs, the members of each pair being diametrically opposed and successive pairs being evenly spaced around the crank-shaft. With this arrangement, vibration is so eliminated that a smoothly running machine is produced, as is explained in detail in my copending applications No. 429,050 and No. 608,754. Adjacent knives are thus driven in substantially opposite directions with relation to each other and alternate knives are slightly out of phase with each other so that the cutting action of the knives does not cause the bread to jump up and down in the loaf carrier.

The upper ends of connecting-rods 35 are slotted to receive slide-rods 36 and are pivoted thereto. Each slide-rod 36 is formed with a cylindrical portion which reciprocates within a suitable bore in guide block 32 so that a bearing guide for the rod is thus provided to properly direction the movement of the cutter. The upper ends of slide-rods 36 are adapted for connection with the lower ends of the thin, elongated knives or cutters 37, while the upper ends of knives 37 are connected with the lower ends of tension springs 38, which are in turn attached at their upper ends to cross-bar 40. Cross-bar 40 is supported by uprights 41 extending vertically from opposite ends of the guide block 32.

As illustrated in Fig. 9, the upper end of each slide-rod is centrally slotted or forked, and has pin 39 transversely of the slot. This pin 39 is preferably fixed, and is located in a definite predetermined position relative to the base 36a of the slide-rod slot. The cutter blade is inserted in the slide-rod slot, and has a slot 37a entering preferably, though not necessarily, from the forward or cutting edge to receive pin 39. When the blade 37 is in the vertical cutting position, the initial portion of slot 37a slopes inwardly and downwardly, and the final portion at 37b is vertical, though the slot as a whole may be considered as angling inwardly and downwardly from the edge of blade 37.

When the knife blade is attached to the slide-rod, it is first inclined to dot-dash line position 37f and slot 37a is hooked over pin 39 until the pin reaches the bend in the slot, when the knife is moved longitudinally to seat the pin in the bottom portion 37b of the slot. The lower end of the knife blade is rounded at 37e so that the blade can be rotated about pin 39 to the vertical position and a spring 38 attached to the upper end of the blade. Tilting the cutter when attaching to the slide-rod is necessary since the clearance between end 37e of the blade and base 36a of the slide-rod slot is less than the vertical height of slot portion 37b, this relation of distances being preferred so that any material amount of relative longitudinal movement between the slide-rod and blade is prevented after the blade has been rotated to its vertical position in extension of the slide-rod, all to the result that the blade may be constrained against movement permitting the pin to leave the slot. The slotted end of the blade is rounded off, at least at the forward corner—meaning the corner at the blade edge from which slot 37a enters—to prevent engagement of that corner with the slot base 36a as the blade is rotated about pin 39. For the sake of appearance and ease in manufacture it is preferred to round the entire end of the blade, the center of curvature being at the pin 39 when seated in slot 37a, that is, in and slightly above the base of slot portion 37b. However, only the forward corner may be so rounded; or, the corner may be cut away as by a straight diagonal bevel so that no material is left outside an outline such as shown that would strike the slide-rod as the blade is rotated about pin 39.

The reciprocating slide-rods move the knives up and down while the tension springs always tend to pull the cutters upwardly. This keeps the cutters under a continuous tension and eliminates any tendency of the knives, which are preferably thin and therefore flexible, to buckle or deviate from a true path under the up-thrust of the rapidly moving slide-rods. Should, however, the springs for any reason fail to pull the knives upwardly, blade end 37e will seat against slot base 36a, without disengaging pin 39 from slot 37a, and the slide-rod will push the knife up, though normally the tension springs keep pin 39 seated in the bottom of slot portion 37b at all times. As an aid in keeping the knives properly spaced and free from side play, guide bar 43, supported by and between uprights 41, receives in slots along its front edge the upper ends of cutters 37. U-shaped reenforcing clips 44 are attached to the knives to enlarge locally the bearing surface between the guide bar and the rear non-cutting edges of the knives.

The tension in knives 37 depends upon the upward pull of tension springs 38, and may be varied by raising or lowering cross-bar 40. Cross-bar 40 is supported at its ends between adjusting nuts 46 threaded onto the top ends of uprights 41 so that the cross-bar may be raised or lowered by turning the adjusting nuts.

Although any other suitable arrangement of the knives or cutters may be used, knives 37 are shown herein as being offset or spaced in the direction of loaf movement, and, preferably, arranged in a V-formation with the apex of the V pointing towards the advancing loaf in order to obtain certain advantages fully detailed in my copending application, Ser. No. 608,754.

The preferred means for moving the loaves of bread through the reciprocating cutters will now be described. Again referring to Figs. 1 and 3, a pair of upright supports in the form of rings 47 are mounted one at each end of base 15; and carried by and betwen these rings is a plurality of rotatively mounted rollers 48, here shown as four in number. Rotatively carried on or around these rollers 48 is the rotary bread carrier 18, which embodies a plurality of relatively thin disc rings 50, supported in and spaced by peripheral grooves 49 provided at regularly spaced intervals along rollers 48. The disposition of parts is such that rings 50 turn longitudinally through the spaces between adjacent cutters, roller grooves 49 being so located as to laterally position the rings within the spaces so that there is no interference with the cutters. The disc rings 50 are formed at their circumferences with outwardly projecting arms 50a, the construction being such as to form between these arms individual compartments 51 for taking successive loaves of bread, as will be understood from an inspection of the drawings.

Figures 5, 6, 7, 8:
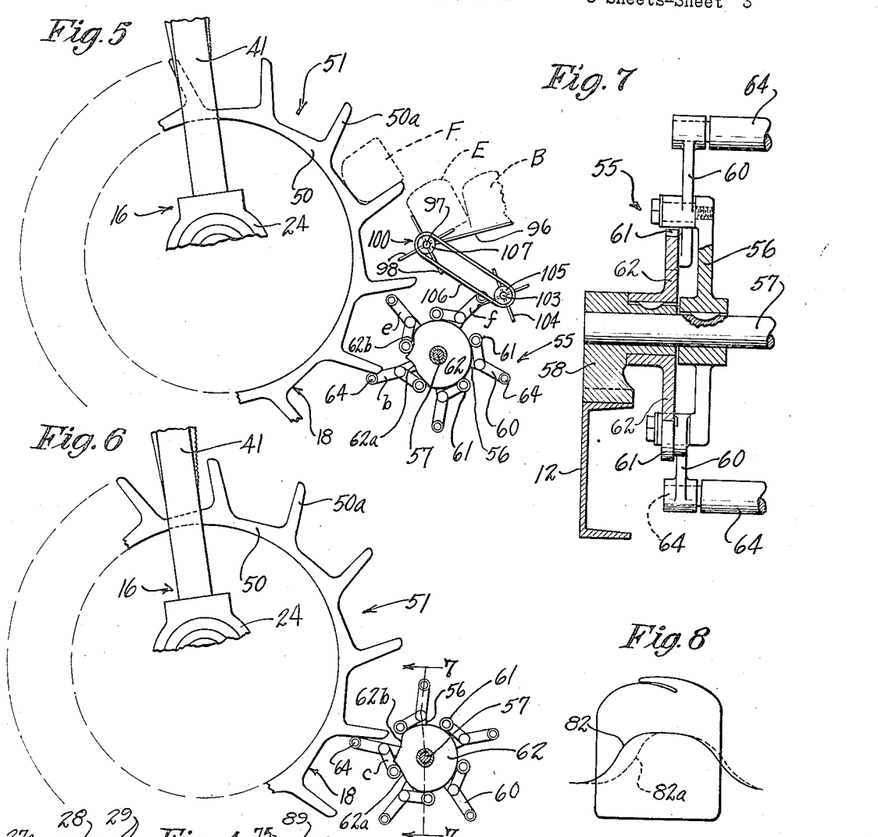
Figs. 5 and 6 are diagrammatic elevations showing successive positions of the rotary carrier and driving mechanism.
Fig. 7 is an enlarged vertical section through one end of the carrier driving mechanism and cam as indicated by line 7—7 in Fig. 6.
Fig. 8 is a diagram showing qualitatively the variation in carrier speed as the loaf passes the cutters.

The carrier thus formed by the spaced rings is driven through the medium of a carrier driver, see Figs. 1 and 7, generally designated by the numeral 55, which includes a pair of star wheels 56 keyed to the opposite ends of laterally extending shaft 57 journaled in bearing brackets 58 mounted on frame members 12. At the outer end of each of the several arms of each star wheel 56 is pivotally mounted a bell crank 60. The inner end of each bell crank has a cam follower in the form of roller 61 which rides around the periphery of stationary cam 62 attached to bearing bracket 58 as indicated in Fig. 7. The outer ends of bell cranks 60 each carry a roller or bar 64. The bell cranks on corresponding arms of the two star wheels 56 are laterally alined so that bars 64, which are rotatively mounted at each end in a bell crank 60, are disposed horizontally across the machine.

Figure 4:
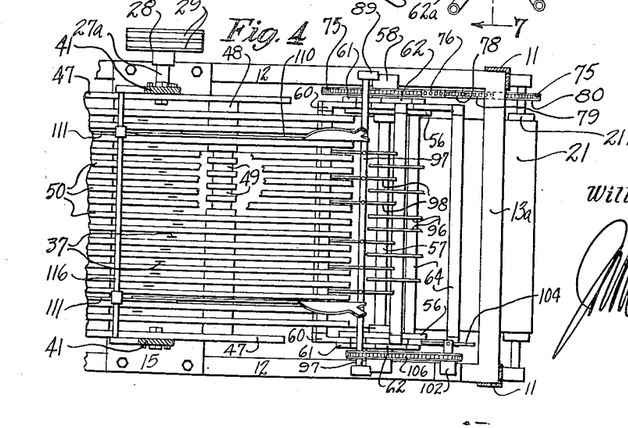
Fig. 4 is a partial plan of the slicing machine on line 4—4 of Fig. 1.

This entire carrier driving assembly is so mounted with relation to the bread carrier 18 that bars 64 mesh with projecting arms 50a of the carrier (Figs. 1 and 4), and, being driven in a right handed or clockwise direction as will be described, acts to continuously rotate the carrier in a left handed or counter-clockwise direction, the several carrier rings simply rolling around on their supporting rollers 48. It will be remembered that spaced rings 50 of the bread carrier are not structurally interconnected but are capable of individual movement on rollers 48, and because of this fact it is necessary to drive the various rings in unison so that the arm 50a of the several rings will be horizontally alined across the loaf carrier to maintain the conformation of the loaf carrying compartments 51. Bars 64 extend horizontally across the entire machine and contact the undersides of all arms 50a, so that all the rings are driven by the same driving member and are, in effect, drivingly interconnected. The carrier driver bars are thus a means not only to drive the rings in unison but also to maintain their alinement and each bar and associated bell cranks constitute as a unit, a pivoted carrier engaging members adapted to engage simultaneously the several driven arms across the carrier.

Power for continuously rotating carrier driver 55 may be furnished by motor 30, in which case pulley 66 is provided on one end of the motor shaft and by means of belt 67 drives pulley 68 of any standard type of gear reduction box, generally indicated at 69. Sprocket wheel 74 on the power take-off shaft of the reduction gear box drives continuous chain 75 which passes over a large sprocket wheel 76 on shaft 57 of the carrier driver, then successively over small sprockets 78, 79 and 80 in order to drive the infeed and discharge conveyor belts, as will be later explained, and finally back over drive sprocket 74.

The rotary carrier 18 is thus in the present instance driven from motor 30 that drives the cutters, suitable gear reduction being provided to give the required speed to the carrier. It is not necessary, however, that the carrier be driven from motor 30; it being, in fact, more desirable in some cases to drive the carrier in synchronism with or by the same prime mover that is used for the drive of the wrapping machine used in conjunction with the slicer. By this latter drive, loaves may be delivered from the slicing machine at the correct rate for delivery to the wrapper.

Progress of the loaf is closely connected with the carrier driving mechanism, the operation of which will now be explained in detail with the help of Figs. 1, 4, 5, 6 and 7. For simplicity of designation, various arms of star wheel 56 will be denoted in typical successive positions by letters $a$, $b$, $c$, $d$, and $e$, and the bell crank 60, the cam follower 61, and the bar 64 that are associated with the star wheel arm will be designated, either separately or collectively, by the same letter. Of course, a star wheel 56 is located at each end of shaft 57 and a cam 62 is placed adjacent each star wheel, but it will be considered for purposes of description as if there were only one star wheel and cam, since the two cams act similarly and simultaneously and the corresponding arms of the two star wheels are always horizontally alined to maintain bars 64 horizontal.

Consider first, only the action of the cam on the bell cranks. Cam 62, is circular except where it has two adjacent concave depressions 62a and 62b in its periphery; and as followers 61 roll around the cam, these depressions cause the bell cranks to rock about their pivotal connections on the star wheel arms. Cam 62 is stationary, and star wheel 56 and a bar 64 rotate in a clockwise direction around it. However, the same relative motion of the cam, cranks, and bars may be had by considering the cam only as moving and that in a counter-clockwise direction; and only the resulting movement, if such is assumed to be the case, will be first considered in the following description of the cam and its operation.

In Fig. 1 the follower $a$ is approaching the first concavity 62a, in Fig. 5 the follower $b$ is entering the concavity, and in Fig. 6 the follower $c$ has just passed the bottom of it. In this first half of the depression, the radius of the cam is continually decreasing so that follower $b$ moves relatively inward toward shaft 57. This results in a counter-clockwise movement of crank $b$ about the star wheel arm as may be seen by reference to Fig. 5, in which the outer end of crank $b$ is slightly inclined to the arm, and to Fig. 6, in which crank $c$ is parallel to the arm, that is, it now extends radially from shaft 57. Fig. 6 shows the follower moving over the second half of the first concavity. In this half, the cam radius is increasing and the crank is moved clockwise relative to the arm towards its advanced or normal position. With the cam contour shown, the radius at the peak between the two concavities is not as great as at the circular portion, so the crank is not fully advanced. The second concavity 62b is of the same general shape as the first one described, and it will be appreciated that the movement of the bell crank as its follower moves over the cam surface will be the same during the first and second halves of the second depression as has been already described.

Shaft 57 rotates at a uniform speed and so does the star wheel. If the cam were circular, the cranks and driving bars would also move at uniform angular velocity about shaft 57; but, as the follower moves over the initial half of each depression in the cam, the crank is rotated relative to the arm so that the driving bar is moved backward against its main rotational movement, and as the follower passes over the final half of each depression in the cam, the driving bar is advanced in the direction of rotation. In each revolution, the bar 64 has two periods when its angular velocity about shaft 57 is less than that of the star wheel, and two periods when its angular velocity is greater. Since it is by direct contact with arms 50a that the bar 64 drives the loaf carrier, it follows that, apart from other factors, the carrier is accelerated during the periods of increasing velocity of bar 64 and decelerated during periods of decreasing velocity. This irregularity in carrier velocity is caused solely by the cam and is determined by the cam shape.

Temporarily disregarding this variable movement of the driving bars, consider the carrier as being driven by a bar moving at a uniform rate, as might be done under circumstances not requiring all the particular advantages derived from my cam arrangement. In Fig. 5, bar $b$ is seen to have contacted an arm 50a to move the carrier forward. However, in this position, the bar has a large velocity component radial of the carrier so that the angular velocity of the carrier is less than when the bar has moved to position $c$ of Fig. 6 where the direction of movement of the bar is nearly tangential to the carrier. The velocity of the carrier decreases as the bar moves from $c$ through $d$ (Fig. 1) to $e$, since the motion of the bar again becomes more or less radial of the carrier and the effective velocity component is consequently decreased.

The amount of this increase and decrease in velocity is affected by the shape and inclination of the underside of arms 50a. These arms are radially or outwardly extending, but are not truly radial since they are tangent to a circle having a radius somewhat less than half that of the carrier. Thus, as the diameter of this circle is increased, arms 50a become more closely tangent to the carrier, and, as a result, the speed of the carrier is affected. When moving on from the position of Fig. 1, the driven arm approaches tangency to the path of bar e, (see Fig. 5) the carrier speed rapidly decreases, the exact amount depending on the inclination of arm 50a. This slowing down causes a very distinct pause or hesitation in the carrier movement.

As has explained, cam 62 produces a non-uniform movement of the driving bars and carrier. The uniform movement of the bars also produces non-uniform movement of the carrier, a non-uniformity inherent in the shape and disposition of the parts used. The first non-uniform movement may be superimposed upon the second inherent motion to produce a wide range of variation in carrier speeds depending on whether the increases and decreases in speed add or subtract. Thus the cam irregularities might be so timed as to neutralize the normal irregularities in the carrier velocity and so result in a substantially constant speed movement, though I prefer a periodic or cyclic change in speed as will now be described.

When follower d in Fig. 1 moves over the initial half of the second cam depression 62b, the driving bar is decelerating the carrier and the carrier velocity decreases. As bar d of Fig. 1 moves to position e of Fig. 5, the next successive bar is in position b of the latter figure. This latter bar is entering on a decelerating period so that bar b will not violently hit the arm of the now relatively slow moving carrier as the bar moves into driving engagement. The carrier is now moved for a short time at an approximately constant velocity until position c of Fig. 6 when the positions of parts are such that the carrier is being accelerated. After acceleration a more or less constant velocity is maintained until the bar reaches about position d of Fig. 1, when the carrier slows down as one bar leaves engagement and a second bar contacts the arms 50a to continue the drive.

This pause is timed to occur as the knives initially contact the loaves, since the crust is tougher than the rest of the loaf and requires considerably more time to cut through than the same thickness of loaf interior. In this manner deformation of the loaf may be avoided. As the knives leave the loaf the carrier again slows down and tearing of the rear crust is avoided. A qualitative representation of the varying carrier speed is shown by the curve 82 in Fig. 8, the ordinates representing carrier velocity when the knives (consider for example the leading pair of knives of the V-formation) are slicing at the point at which the ordinate is measured.

From the foregoing it will be understood how different carrier speed curves may be obtained by changing the characteristics of the cam 62; and it is to be understood that my invention is not limited to any particular speed curve or cam outline, for several cam outlines may be used that will provide curves giving suitable increasing and decreasing speeds of the load carrier; nor indeed is a cam entirely necessary since a certain periodic variation in carrier speed is inherent in the arrangement described even with uniformly moving driving bars, as has been explained. By deepening the concavity, the acceleration and deceleration of the driving bars are increased in amount; and by lengthening the concavities the acceleration and deceleration periods are lengthened so that the shape of the curve in Fig. 8 may be altered and the ratio between maximum and minimum ordinates changed. Thus in case of loaves having a split top crust which it is undesirable to start cutting at full speed, the cam may be shaped to produce the speeding up of the carrier at somewhat later point as shown by the dotted portion 82a of the curve.

A small amount of rotation of cam 62 about shaft 57 has chiefly the effect of shifting the curve to the right or left relative to the loaf without much alteration in shape. The curve may thus be adapted to loaves of various widths so that the knives always contact the loaf at relatively slow carrier speed. This accommodation to the loaf width is preferably, however, obtained by shifting the knives along the loaf path by swinging the crank case about its pivotal mounting in brackets 25. With the cam held stationary, a wide range of loaf widths may be readily adjusted for merely by shifting the knives to some new position. A bolt 31 in each of uprights 41 passes through slots 47a in rings 47 and permits the slicing head to be clamped to rings 47 to hold it in the adjusted positions. Slot 47a is about the length of one compartment 51 so that the head can be moved to bring the knives into contact with the loaf at any point in the entire speed cycle.

In order to place the loaves onto the rotary loaf carrier, there is provided certain automatic feeding mechanism for transferring the loaf from the feed belt 20, where it rides top side up, to a position bottom side up in the compartment 51 of the carrier. This function is performed by mechanism that will now be described. Extending rearwardly from brackets 90 fastened to uprights 11, are a pair of horizontal rods 91. Roller 92 is mounted between brackets 90 adjacent uprights 11, and rear roller 93 is mounted between the rearward ends of rods 91. Mounted forwardly of and somewhat below roller 92, and between the forwardly extending plate 89 is a forward drive roller 94 for the belt 20. Conveyor belt 20 thus passes around the three rollers 92, 93 and 94, the belt taking a downwardly inclined path between rollers 92 and 94. The shaft of roller 94 has on it gear 94a (Fig. 4) meshing with gear 94b fastened to the shaft on which the chain driven sprocket 78, heretofore referred to, is fastened. The driving roller 94 for the conveyor belt will thus be seen to be driven by the continuous chain 75 that actuates carrier driver 55, and the gearing is such that the direction of travel of the upper side of the conveyor belt is toward the bread carrier.

Mounted between plates 89 forwardly of roller 94 is a stationary bar 95 provided with spaced, forwardly extending pins or wires 96 (Figs. 1 and 5) which form a platform in continuation of the downwardly inclined portion of the conveyor belt and serve to receive the forwardly traveling loaves of bread therefrom. Mounted between the extreme forward end of plates 89 is the inverting mechanism 100 which embodies a shaft 97 journaled at its ends in plates 89 and provided with four sets of 90° spaced pins or wires 98 thus forming an inverting stile. These wires are adapted to turn through the spaces between stationary wires 96 upon which the bread is received from the conveyor belt, and are also disposed to turn at the other side through the spaces between the projections or arms 50a of the carrier 18. The relative disposition of the parts is such that shaft 97 of the inverter is located substantially in the plane of the downwardly inclined stationary feed wires 96, and also over the carrier driver 55 and in such relation to the bread carrier that when rotated left-handedly, as viewed in Fig. 1, a loaf of bread is picked up by wires 98 from stationary wires 96, as loaf E in Fig. 5, and is carried over through the arc of a circle and positioned, bottom side outward, in a compartment 51 of the carrier.

The operating means for the inverting mechanism is embodied as follows: Mounted below the inverter on the upper end of bracket 102 carried by a frame member 12, is a rotatable spindle 103 upon which is carried star wheel 104. The radial arms of star wheel 104 are successively engaged and moved by the successive bars 64 of carrier driver 55 (Figs. 1 and 5) which acts to impart intermittent rotation to star wheel 104 as will be understood. Spindle 103 has affixed to it sprocket 105 (see Fig. 7) which is connected by means of chain 106 to sprocket 107 attached to shaft 97 of the inverter. The inverter is thus operated intermittently through the chain connection from the intermittently driven star wheel 104. In the present instance there are four radial arms on star wheel 104, and the relations are such that each engagement of a bar 64 with an arm of star wheel 104 causes rotation of the inverter through 90°.

With the foregoing description of mechanism in mind, the passage of a loaf through the slicing machine may now be outlined. The operator places a series of loaves A, bottom side down, on the upper horizontal portion of conveyor belt 20 as shown, a guide rail 109 being adjustably mounted on the slicer frame to line up the loaves on the belt. Loaf A is carried through the successive positions B and C down the inclined portion of the conveyor belt until the loaf is stopped in position C by a vertical set of wires 98. The loaf now rests within a compartment provided between one of the successive sets of wires 98 and the stationary wires 96, the inverter at this time being stationary. The next loaves follow up closely and come to rest in contact with each other, as the loaf in position B, on the inclined portion of the conveyor belt which slips underneath the stopped loaves.

Rotation of the carrier driver brings bar f (Fig. 5) into contact with an arm of star wheel 104 so that this star wheel is rotated through 90°. This motion is transmitted through chain 106 to the inverting mechanism which picked up loaf C from wires 96 and rotates it through 90° so that the loaf is finally placed in position F in a compartment 51 of the constantly moving loaf carrier. Bar f of the carrier driver preferably contacts star wheel 104 at such a time that the loaf is deposited within the carrier compartment during the slow movement of the carrier.

Briefly, the mechanism is so designed and timed that, as the successive compartments of the bread carrier reach the proper position opposite the feeding or inverting stile 100, the stile is actuated to pick up a loaf resting on wires 96 and to turn the loaf through a quarter of a circle into a position within the proper carrier compartment where the loaf is picked up by carrier arms 50a and moved to and through the cutters.

As the loaf is moved through the cutters by the loaf carrier, the loaf is positioned with respect to the knives by means of suitable guides placed one at each end of the loaf and adapted to confine the slices to keep the loaf in its original form after slicing. A suitable form of end guide is shown in Fig. 1, and comprises arcuate sheets 110, 111, and 112, adapted to be fitted in the spaces between the carrier rings. Sheet 110 is rotatably mounted on rod 113 carried at the top of a pair of brackets 114, and the forward end of the sheet rests upon the upper right hand roller 48. Sheet 111 is rotatably mounted on rod 116 carried between uprights 41, and is also supported by resting upon the upper left hand roller 48. Sheets 110 and 111 are thus adjustable laterally across the carrier since they may be rotated vertically about rods 113 and 116, respectively, then slid along these rods to any desired position, and finally dropped between two carrier rings to guide the loaf. Sheet 112 is supported at its upper end from rod 118 carried between the tops of a pair of uprights 119 and rests at its lower end on rod 120 extending between brackets 121. This sheet may be lifted vertically out of the spaces between the carrier ring and reinserted at the desired position to form a continuation of sheet 111. By this means, the loaf is properly positioned with respect to the cutting knives and the slices are held together until such time as the sliced loaf has dropped onto discharge belt 21, when a pair of guide rails 125, positioned in continuation of sheets 112, hold the sliced loaf together.

The loaf is held within the carrier compartment on the downwardly moving side of the loaf carrier by means of guide 126. This guide is a laterally extending sheet, curved to conform generally to the loaf path, and supported at its upper end from bar 118 and resting at its lower end on rod 120. This guide presses against the bottom side of the loaf and holds the loaf within the carrier compartment until the bottom of the carrier is reached when the loaf slides out of the carrier compartment onto the discharge belt 21 carried around rollers 21a and 21b, the latter being driven by sprocket 80.

It will be understood that the drawings and description are to be considered merely as illustrative of and not restrictive on the broader claims appended hereto, for various changes in design, structure, and arrangement may be made without departing from the spirit and scope of said claims.

I claim:

1. In a slicing machine adapted to slice a loaf of bread, a loaf carrier moving longitudinally in a single continuous direction, driving means for the carrier adapted to move the carrier at a periodically varying speed, a cutter working across the path of the loaf carrier, and an adjustable support for the cutter permitting it to be shifted longitudinally of the carrier to effect initial loaf contact at a point of relatively slow speed of the carrier.

2. In a slicing machine adapted to slice a loaf of bread, a longitudinally moving loaf carrier moving continuously forward in a closed circuit, driving means for the carrier adapted to move the carrier at a periodically varying speed which is slow, then becomes faster, then again becomes slow, a cutter working across the path of the loaf carrier, and an adjustable support for the cutter permitting it to be shifted longitudinally of the carrier to effect initial loaf contact at a point of relatively slow speed of the carrier.

3. In a slicing machine adapted to slice a loaf of bread, a circular rotary carrier having loaf carrying compartments about its periphery, driving means for the carrier adapted to move the carrier at a periodically varying speed, a cutter working across the path of the loaf, and an adjustable support for the cutter permitting it to be shifted around the periphery of the carrier to effect initial loaf contact at a point of relatively low carrier speed.

4. In a slicing machine adapted to slice a loaf of bread, a circular rotary carrier having loaf carrying compartments about its periphery, driving means for the carrier adapted to move the carrier at a periodically varying speed, a cutter working across the path of the loaf, and a pivotal support for the cutter permitting it to swing about the carrier axis to shift the knives about the periphery of the carrier to effect initial loaf contact at a point of relatively low carrier speed.

5. In a slicing machine adapted to slice a loaf of bread, a circular rotary loaf carrier comprising a plurality of laterally spaced rings; supporting means and driving means for the carrier; a slicing head comprising a plurality of laterally spaced cutters working between the carrier rings across the path of the loaf, driving means for the cutters interior of the ring, and cutter supports exterior of the rings; and a support for the slicing head permitting the head to swing about the carrier axis to shift the cutters along the periphery of the carrier.

6. In a slicing machine adapted to slice a loaf of bread, a circular rotary loaf carrier comprising a plurality of laterally spaced rings; supporting means and driving means for the carrier; a slicing head comprising a plurality of laterally spaced cutters working between the carrier rings across the path of the loaf, driving means for the cutters interior of the rings, and cutter supports exterior of the rings; and a support for the slicing head permitting the head to swing about the carrier axis to shift the cutters along the periphery of the carrier, said head support comprising a circular boss at each end of the head and bearing standards journalling the bosses.

7. In a slicing machine adapted to slice a loaf of bread, a circular rotary loaf carrier comprising a plurality of laterally spaced rings; supporting means and driving means for the carrier; a slicing head comprising a plurality of laterally spaced cutters working between the carrier rings across the path of the loaf, driving means for the cutters interior of the rings, and cutter supports exterior of the rings; a support for the slicing head permitting the head to swing about the carrier axis to shift the cutters along the periphery of the carrier; and means to clamp the slicing head to the carrier support in adjusted positions.

8. In a slicing machine adapted to slice a loaf of bread, a loaf carrier for moving a loaf, said carrier having a series of projecting arms, and driving means engaging said arms to drive the carrier at a periodically varying speed; said carrier drive means comprising a drive shaft rotating at constant velocity, a carrier engaging member rotated by said shaft, and cam means to vary the angular velocity of the carrier engaging member relative to the shaft.

9. In a slicing machine adapted to slice a loaf of bread, a loaf carrier for moving a loaf, said carrier having a series of projecting arms, and driving means engaging said arms to drive the carrier at a periodically varying speed; said carrier drive means comprising a drive shaft rotating at constant velocity, a star wheel fastened to said drive shaft, a carrier engaging member pivotally mounted on an arm of the star wheel, and means to rock the carrier engaging member about its pivot during engagement of said member with an arm of the loaf carrier.

10. In a slicing machine adapted to slice a loaf of bread, a loaf carrier for moving a loaf, said carrier having a series of projecting arms, and driving means engaging said arms to drive the carrier at a periodically varying speed; said driving means comprising a constant velocity drive shaft, a star wheel rotating with said shaft and having a plurality of arms, a member pivoted to each star wheel arm to engage the arms of the loaf carrier, and cam means to vary the angular velocity of said engaging members about the drive shaft.

11. In a slicing machine adapted to slice a loaf of bread, a loaf carrier, said carrier having a series of projecting arms, and driving means engaging said arms to drive the carrier at a periodically varying speed; said driving means comprising a stationary cam, a drive shaft, a star wheel fastened to said shaft, a bell crank on each star wheel arm, a cam follower on one end of each bell crank, and a member at the other end of each bell crank to engage the arms of the loaf carrier.

12. In a slicing machine adapted to slice a loaf of bread, a circular rotary loaf carrier comprising a plurality of laterally spaced rings having projecting arms about their peripheries that, when alined, form loaf carrying compartments, and means driving the carrier at a periodically varying speed by engagement with said arms of the several rings; the carrier drive means comprising a laterally extending drive shaft, a stationary cam near each end of the drive shaft, a star wheel fastened to the drive shaft adjacent each cam, a bell crank pivoted to each star wheel arm, a cam follower on each bell crank for engaging the adjacent cam, and carrier engaging bars extending laterally between corresponding cranks of the star wheels to engage the arms of the rings to aline arms and drive the carrier.

13. In a slicing machine adapted to slice a loaf of bread, a circular rotary loaf carrier comprising a plurality of laterally spaced rings having projecting arms about their peripheries that, when alined, form loaf carrying compartments, and means driving the carrier at a periodically varying speed by engagement with said arms of the several rings; said drive means comprising a laterally extending drive shaft rotating at constant velocity, a star wheel near each end of the shaft and rotating therewith, a carrier engaging member extending laterally between the star wheels, and cam means to rock the carrier engaging member relative to the star wheels to vary its angular velocity about the drive shaft.

14. In a slicing mechanism, a slicing knife and a slide-rod adapted to be drivingly connected to one end of the knife, said knife comprising the combination of an elongated blade sharpened along one of its long edges, and a relatively thick bearing member fastened to said blade near one end thereof for enlarging the bearing area locally along the rear non-cutting edge of the blade, the knife having an attaching expedient at the end where the bearing member is located and having near the other end a single attaching slot that has a portion entering the knife from one long edge and a vertical portion located centrally of the knife near its end; said slide-rod having a slot at one end adapted to receive the knife, and a pin in the slide-rod extending transversely of the slide-rod slot and adapted to be engaged by the knife slot, said pin being normally seated in the lower end of the vertical portion of the attaching slot in the knife, and the clearance between the end of the knife and the base of the slide-rod slot being less than the height of the vertical portion of the attaching slot.

15. In a slicing machine adapted to slice a loaf of bread, a longitudinally moving loaf carrier moving continuously forward in a closed circuit, driving means for the carrier adapted to move the carrier at a periodically varying speed, a cutter working across the path of the loaf carrier at a point spaced longitudinally from said driving means, and means permitting relative adjusting movement of the cutter and the carrier driving means longitudinally of the carrier to effect initial loaf contact with the cutter at a point of relatively low carrier speed.

16. In a slicing machine adapted to slice a loaf of bread, a circular rotary carrier having loaf carrying compartments about its periphery, driving means for the carrier adapted to move the carrier at a periodically varying speed, a cutter working across the path of the loaf at a point spaced about the periphery of the carrier from said driving means, and means permitting relative adjusting movement of the cutter and said driving means about the periphery of the carrier to effect initial loaf contact with the cutter at a point of relatively low carrier speed.

17. A bread slicing knife comprising the combination of an elongated blade sharpened along one of its long edges, and a relatively thick bearing member fastened to said blade near one end thereof for enlarging the bearing area locally along the rear non-cutting edge of the blade, the knife having an attaching expedient at the end where the bearing member is located and having near the other end another attaching expedient comprising a slot having a transverse portion entering the knife from one of the long edges thereof and also a longitudinal portion extending lengthwise of said knife, the said transverse and longitudinal portions of said slot intersecting each other to form a single continuous slot, the said longitudinal portion of said slot extending from the place of said intersection toward the adjacent end of the knife, and the corner of said knife where the knife end adjacent said slot meets said long edge of the knife from which said transverse slot portion enters, being cut away so that no part of said corner of the knife lies substantially beyond a curve drawn on a radius extending from the outermost extremity of the knife end adjacent said slot to a point serving as a center and located within the longitudinal portion of said slot near that end thereof that is closest to the adjacent knife end, substantially for the purpose set forth.

WILLIAM WALTER HARTMAN.